(12) United States Patent
Walter

(10) Patent No.: US 9,106,465 B2
(45) Date of Patent: Aug. 11, 2015

(54) MULTIWIRE LINEAR EQUALIZER FOR VECTOR SIGNALING CODE RECEIVER

(71) Applicant: Kandou Labs SA, Lausanne (CH)

(72) Inventor: Christoph Walter, Lausanne (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/550,537

(22) Filed: Nov. 21, 2014

(65) Prior Publication Data

US 2015/0146771 A1 May 28, 2015

Related U.S. Application Data

(60) Provisional application No. 61/908,009, filed on Nov. 22, 2013.

(51) Int. Cl.
| | |
|---|---|
| *H03H 7/40* | (2006.01) |
| *H04L 25/03* | (2006.01) |
| *H03F 3/19* | (2006.01) |
| *H03F 3/45* | (2006.01) |

(52) U.S. Cl.
CPC ............ *H04L 25/03885* (2013.01); *H03F 3/19* (2013.01); *H03F 3/45071* (2013.01); *H03F 2200/451* (2013.01); *H03F 2203/45256* (2013.01)

(58) Field of Classification Search
CPC ................ H04L 25/067; H04L 1/0005; H04L 25/03038; H04L 25/03509

USPC ................. 375/232, 257, 264, 295, 316, 340; 341/55, 56

See application file for complete search history.

(56) References Cited

U.S. PATENT DOCUMENTS

| | | |
|---|---|---|
| 3,939,468 A | 2/1976 | Mastin |
| 6,417,737 B1 | 7/2002 | Moloudi et al. |
| 6,448,815 B1 * | 9/2002 | Talbot et al. ..................... 326/86 |
| 8,649,445 B2 | 2/2014 | Cronie |
| 2011/0051854 A1 | 3/2011 | Kizer et al. |
| 2011/0268225 A1 | 11/2011 | Cronie |
| 2011/0302478 A1 | 12/2011 | Cronie |
| 2014/0119424 A1 * | 5/2014 | Francese et al. .............. 375/232 |
| 2014/0198837 A1 | 7/2014 | Fox |
| 2014/0226734 A1 | 8/2014 | Fox |
| 2014/0254642 A1 | 9/2014 | Fox |

OTHER PUBLICATIONS

Notification of Transmittal of the International Search Report and the Written Opinion of the International Searching Authority, or the Declaration for PCT/US2014/66893, dated Mar. 3, 2015, 9 pages.

* cited by examiner

*Primary Examiner* — Khai Tran
(74) *Attorney, Agent, or Firm* — Invention Mine LLC

(57) ABSTRACT

Continuous-time linear equalization of received signals on multiple wire channels while maintaining accurate common mode signal values. Multiwire group signaling using vector signaling codes simultaneously transmits encoded values on multiple wires, requiring multiple receive signals to be sampled simultaneously to retrieve the full transmitted code word. By misaligning transitions on multiple wires, skew introduces a transient common mode signal component that is preserved by using frequency-selective common mode feedback at the receiver to obtain accurate sampling results.

14 Claims, 4 Drawing Sheets

MULTIWIRE LINEAR EQUALIZER FOR VECTOR SIGNALING CODE RECEIVER

This application claims priority to U.S. Provisional Application Ser. No. 61/908,009, filed Nov. 22, 2013, which is incorporated herein by reference.

TECHNICAL FIELD

The present invention relates to communications in general and in particular to the transmission of signals capable of conveying information and detection of those signals in chip-to-chip communication.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference (i.e., "effective signal ground"), multiple such circuits relative to ground or other common reference, or multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. Any suitable subset of a vector signaling code denotes a "sub code" of that code. Such a subcode may itself be a vector signaling code.

Examples of vector signaling methods are described in Cronie I, Cronie II, Cronie III, Fox I, Fox II, Fox III, Fox IV, and Holden I.

BRIEF DESCRIPTION

A receiver for vector signaling encoded information accepts multiple wire inputs corresponding to the multiple components of a codeword. Commonly, different voltage, current, etc. levels are used for signaling and more than two levels might be used to represent each codeword element, such as a ternary signaling code wherein each wire signal has one of three values. The receiver may optionally amplify, condition, and filter the received signals and then samples them to provide time-concurrent values which are then analyzed and decoded.

In accordance with at least one embodiment of the invention, circuits are described for the efficient equalization and pre-sample-processing of vector signal coded data transmitted over physical channels such that the signals are resilient to common mode noise, do not require a common reference at the transmission and reception points, and can produce a higher pin efficiency than conventional differential signaling with relatively low power dissipation for encoding and decoding.

As the vector signaling code is communicated by transmission of code elements on each of an ensemble of wires comprising the communications channel, accurate determination of the received code value requires a detector to accurately sample every code element of a code word. Timing skew among these code elements introduces sampling errors. In particular, misalignment of signal transitions on multiple wires presents as transient variations in common mode signal across the ensemble. Continuous-time linear equalization applied to receive signals must not reject this component of the common mode signal as spurious, as it may represent a significant component to be recovered by the samplers.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

DETAILED DESCRIPTION

Figure 1:
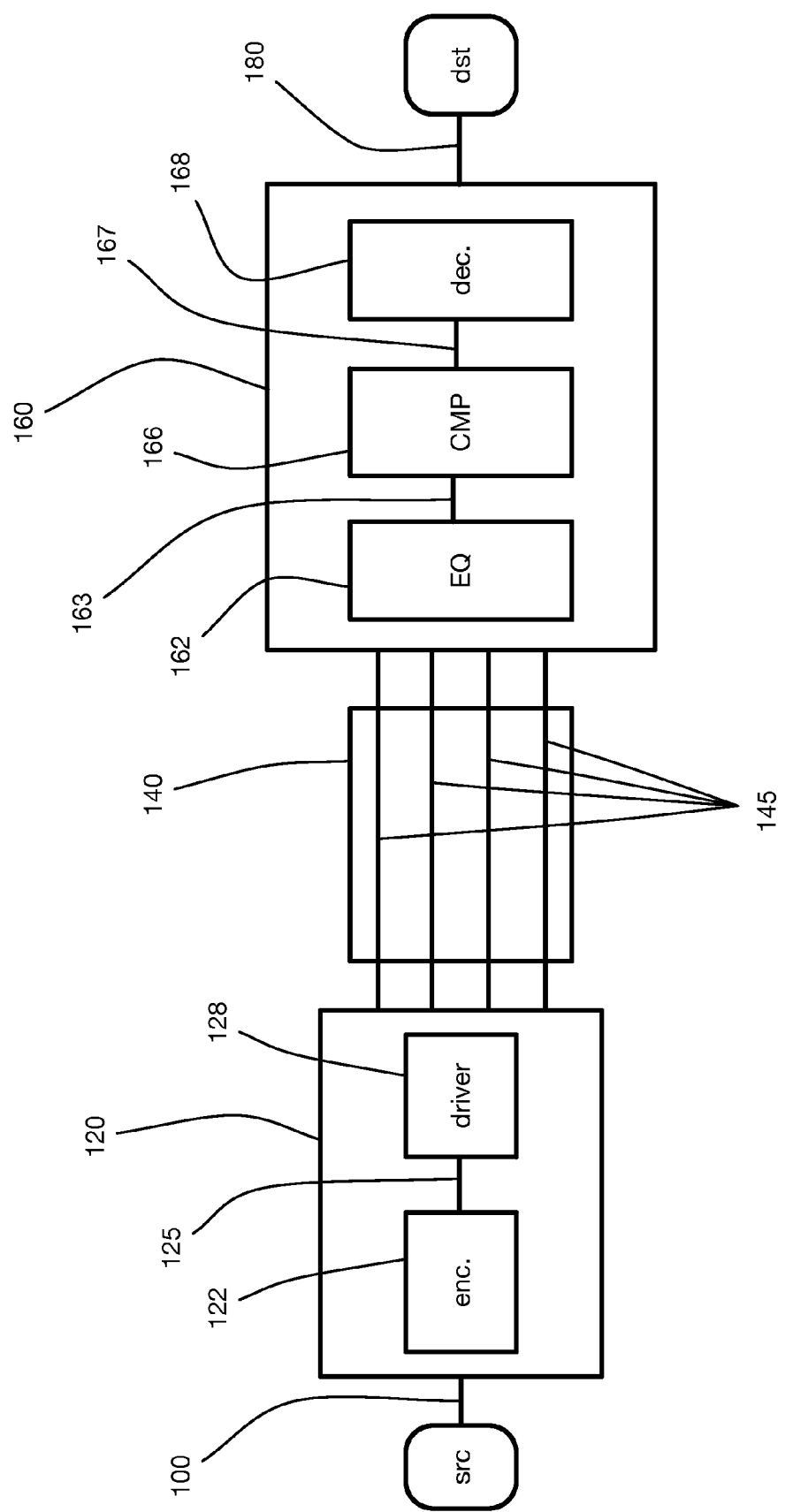
FIG. 1 is a block diagram of a typical vector signaling code system.

An example of a typical systems environment incorporating vector signaling code communication is shown in FIG. 1. Information to be transmitted 100 is obtained from a source SRC and presented to transmitter 120. Within the transmitter, the information is encoded 122 as symbols of a vector signaling code 125, which are then presented to transmit driver 128, generating physical representations of the code symbols on a collection of wires 145 which together comprise the communications channel 140.

Receiver 160 accepts physical signals from communications channel 140, detects the received codewords using, as one example, a collection of differential binary comparators 166, and then decodes 168 those detected values 167 to obtain the received information 180 output to a destination device DST.

In a practical embodiment, signals 145 may undergo significant change in amplitude, waveform, and other characteristics between emission by transmitter 120 and arrival at receiver 160, due to the transmission characteristics of communications channel 140. Therefore, it is common practice to incorporate signal amplification and/or equalization 162 into communications channel receivers. Continuous time linear equalization, also called CTLE, is a known method of providing per-wire equalization in communications systems.

The use of vector signaling code offers the possibility of increased information density, or so-called "pin efficiency" as measured in bits of information transmitted per communications channel wire, as well as immunity from common mode and other noise. As one example, a balanced vector signaling code may be designed to obtain many of the noise immunity benefits of Differential Signaling without its disadvantageous low pin efficiency. However, the need for the receiver to accurately obtain samples representing each element of the transmitted codeword introduces the risk of new types of communications distortion. In particular, differential propagation velocity or "skew" among the various wires may cause different elements of the codeword to arrive at the receiver at different times, even though they were all transmitted simultaneously. Holden I teaches several methods to mitigate the effects of skew in vector signaling code applications.

These known approaches to skew compensation address the temporal aspect of differential arrival times on the receiver by, as an example, separately selecting the sampling time of each wire. Stated differently, these approaches deal with the closing of the receiver eye pattern in the horizontal direction, as a fixed sampling time becomes too early for accurate sampling of some receive signals, and too late for others.

Figure 2:
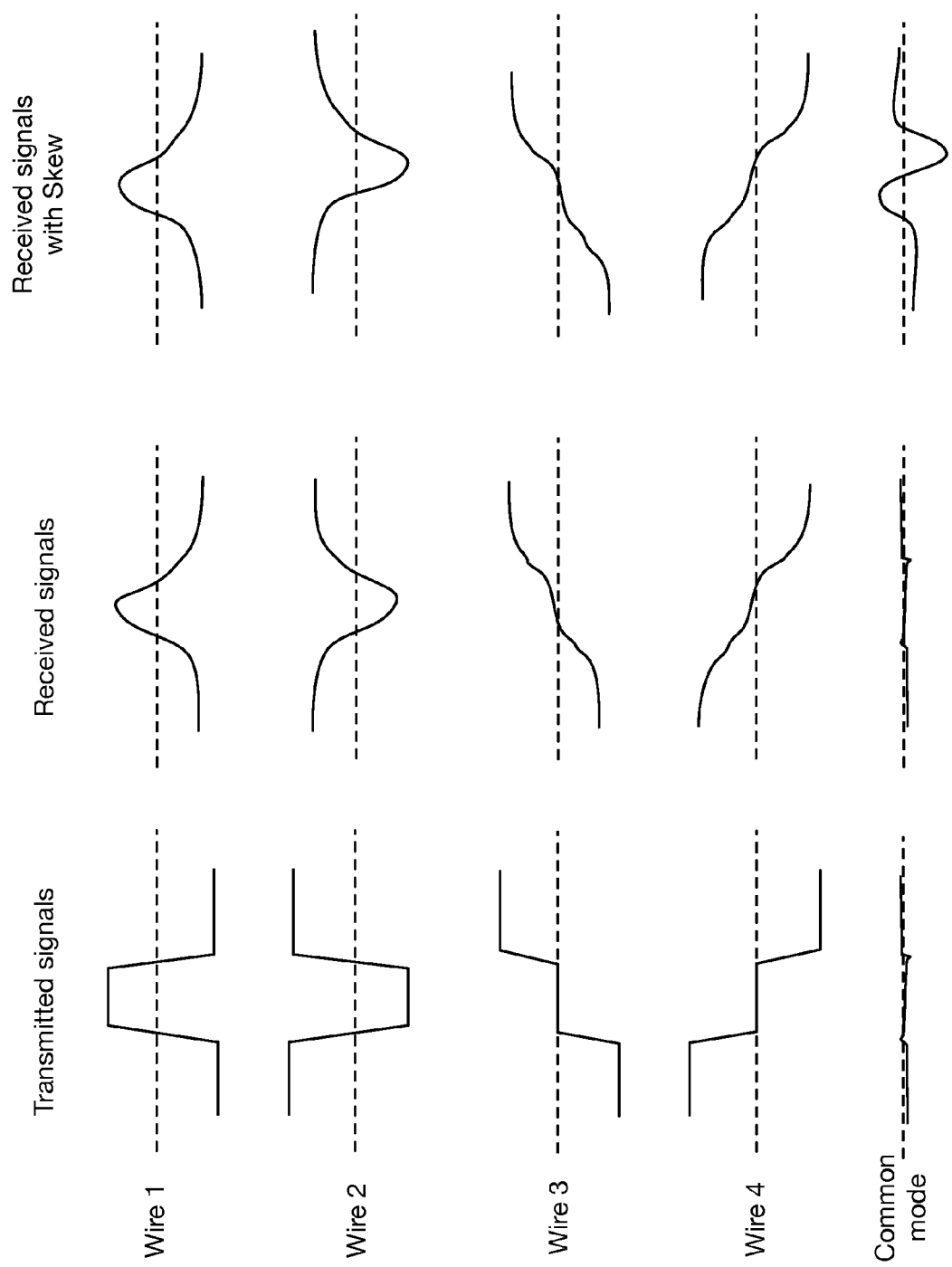
FIG. 2 shows example signal waveforms, illustrating the effect of skew on the common mode signal component of a set of received signals.

FIG. 2 shows another negative aspect of skew on a vector signaling code receiver. The waveforms for "Transmitted signals" labeled as "Wire 1" through "Wire 4" represent four example outputs of a vector signaling code transmitter using a ternary (i.e. three level) code over three transmitted symbol intervals. As may be seen, the example code is balanced, in that the sum of all transmitted wire outputs is zero for each symbol interval. This is also seen in the "Common mode" Transmitted signal waveform, which remains essentially zero due to the balanced nature of the transmitted signals.

Seen from the receive end of the communications channel, these same waveforms labeled as "Received signals" are seen to be both attenuated in amplitude, and having significantly slowed rise- and fall-times, due to high frequency attenuation in the channel. Even so, the common mode signal (effectively equivalent to the sum of all received wire signals) is still essentially zero, as the frequency and amplitude distortions are approximately identical for all four wires.

However, this situation changes considerably if a small amount of differential delay occurs, as illustrated in FIG. 2 as "Received signals with skew" where as an example the Wire 2 signal is slightly delayed and the Wire 3 signal is slightly advanced. The early rising edge of Wire 1 no longer coincides with the falling edge of Wire 2, leading to first a positive peak and then a negative peak in the Common mode signal. Similarly, the offsets between Wire 3 and Wire 4 causes first a slight negative offset followed by a slight positive offset to the Common mode signal.

One familiar with the art would observe that conventional sampling of the skewed waveforms using the Common mode signal as a reference will result in an apparent vertical closing of the receive eye for the Wire signals, as well as the horizontal closing caused by the previously-described timing variations. This effect will be more significant if different sampling times are used for the Wire signals.

A similar result will occur if conventional equalization and common-mode rejection techniques such as continuous time linear equalization and differential common mode amplification are applied on the individual wires, whether subsequent detection is performed differentially between the resulting equalized wire signals or individually on each wire. Common practice for an analog equalizer, as one example in a differential signaling application, relies on a differential transistor pair with parallel-RC source degeneration. Such a circuit provides equalization of the differential signal through a zero-pole pair, while also rejecting the common-mode signal completely.

Continuous time linear equalizer with controlled common mode rejection

As previously described, if continuous-time linear equalization is required to compensate for channel losses, the equalizer must not reject the common-mode signals that appear as a result of channel skew, because it represents a part of the signal to be recovered by the sampler/de-skew circuit.

The component of the common-mode signal caused by channel skew is band-limited, has zero mean, and appears only around transitions of the transmitted signal. It is therefore desirable to implement a linear equalizer that passes common-mode signals in the frequency band of interest, and rejects low-frequency common-mode signals, such as are associated with induced noise.

Figure 3A:
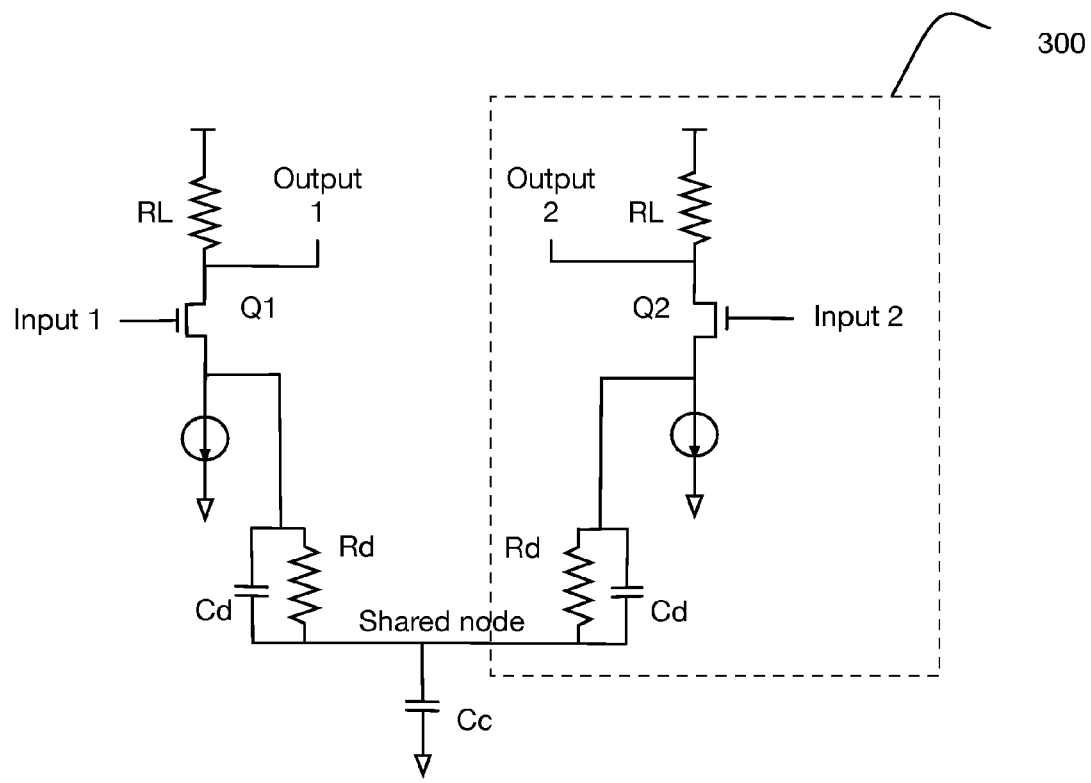
FIG. 3A is a schematic diagram of one wire element of the described equalizer.
Figure 3B:
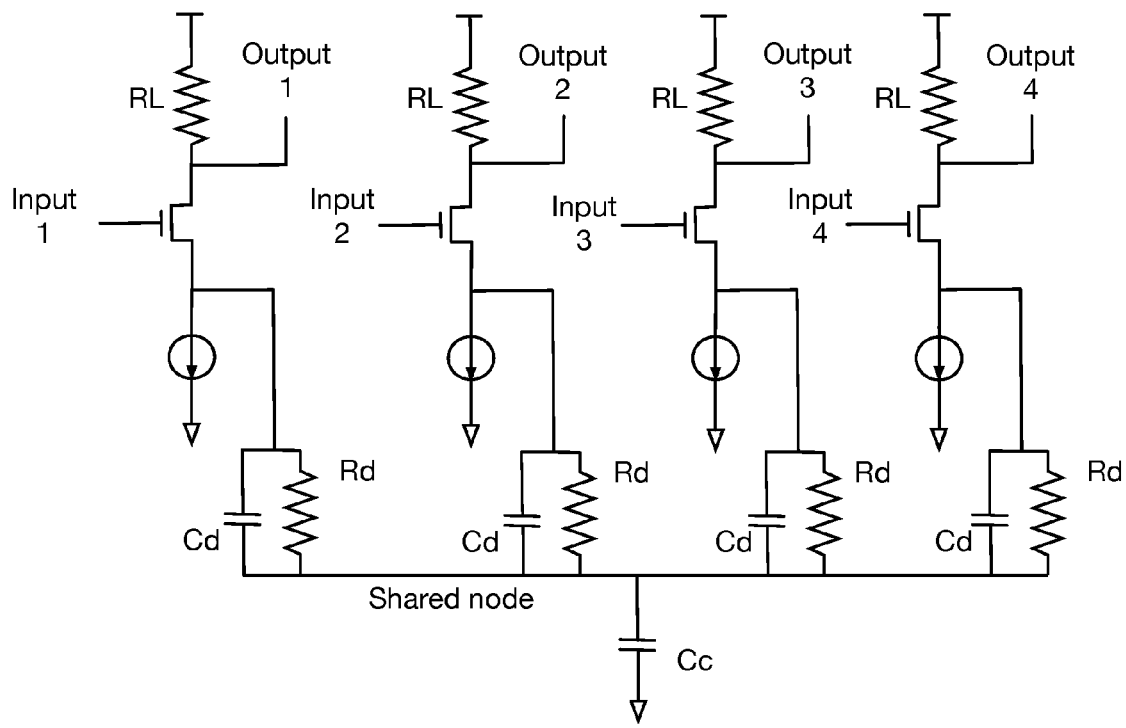
FIG. 3B is a schematic diagram of an embodiment of a four wire equalizer.

FIGS. 3A, 3B illustrate a circuit providing the desired equalization with controlled common mode rejection for an arbitrary number of channel signals. For descriptive purposes, the schematic of FIG. 3A is drawn in the style of a differential pair, accepting two inputs Input 1 and Input 2 and producing two outputs Output 1 and Output 2. However, the fundamental circuit element 300 is intended to be replicated as required to support additional inputs, thus the example may be extended to support an arbitrary number of inputs and outputs. As a specific example, FIG. 3B shows an embodiment in which the circuit of FIG. 3A has been extended to support four inputs and provide four outputs.

In FIG. 3A, transistors Q1 and Q2 are a matched pair, accepting Input 1 and Input 2, and generating Output 1 and Output 2 across their respective loads RL. Unlike a conventional differential amplifier having a shared source current sink, each of Q1 and Q2 has its own current sink, as well as parallel RC network Rd and Cd connecting to the Shared node that has capacitance Cc to ground.

If Cd<<Cc, the desired low-frequency common mode behavior can be understood by discarding Cd. Starting at f=0, the circuit is a type of "generalized differential pair", consisting of N transistors (with biasing current source) with their source nodes connected together by a star network of N resistors of value Rd. This circuit has a small-signal (differential) gain of RL/Rd in the general case. In this region of operation, common mode signals such as noise are suppressed by the differential amplifier behavior of the circuit.

Above the cutoff frequency or corner frequency 1/(2pi*(Rd/N)*Cc), the capacitor Cc has low impedance, and the circuit therefore presents as N independent single-ended common source amplifiers with a source degeneration Rd. In this region of operation, common mode signals as are caused by skew are not suppressed. It is understood that the transition between these two regions is gradual, and that the cutoff frequency terminology refers to a characteristic (a so-called 3-dB point) of the transition between these frequency regions. References to conveying signals in one region while shunting signals in another region should not be interpreted as a binary, or even rapid transition between regions, but rather a gradual transition as is know in the electrical arts.

As a result, this circuit rejects the common-mode signal at low frequency and passes it at high frequency. This makes the circuit work correctly in the case of skew in the channel, which causes a high-frequency common-mode signal to appear that, if suppressed, would reduce detection margins.

At even higher frequencies, above around $1/(2\pi \cdot Rd \cdot Cd)$ the resistor is effectively short-circuited by the capacitor Cd, and the gain rises to gm*RL, where gm is the transistor transconductance. The Rd/Cd network thus adds a zero-pole pair with a peaking of gm*Rd. In this region of operation, the circuit acts as a high-frequency equalizer. Note that in some embodiments, Cd and the signal peaking it provides may not be needed or desired, and may be omitted.

As previously described, the fundamental circuit element 300 is intended to be replicated as required to support additional inputs, thus the examples presented explicitly include an arbitrary number of inputs and outputs. In such cases, each of the multiple instances of 300 are intended to be identical, with all transistors matching, all named component values in common, and the calculated value of Cc scaling with N, as indicated by the corner frequency examples above. As a specific example, FIG. 3B shows the circuit of FIG. 3A extended to support four inputs and provide four outputs, using four matched transistors in an extended differential amplifier design.

An embodiment incorporating the circuit of FIG. 3B in front-end processing for a vector signaling code receiver maintains outputs having the necessary components of the common-mode signal to minimize skew related amplitude error. A further embodiment also incorporating a multi-wire sampler with adjustable sampling clock phase per wire also provides compensation for the temporal component of input skew error, resulting in an undistorted representation of the received codeword. Other embodiments combine fewer or more instances of circuit element 300 and samplers with adjustable clock phase per wire, to provide equivalent amplitude and temporal skew compensation for reception of shorter or longer codewords.

Therefore, in one embodiment, the circuit comprises a plurality of transistors, each transistor of the plurality of transistors having (i) an input node connected to a respective wire of a multi-wire communication medium, (ii) a drain-connected load impedance, (iii) a transistor drain signal output node, (iv) a transistor source node and (v) a source-connected current sink; a plurality of degeneration impedances, each separately connecting respective transistor sources to a common node; and, a common node capacitance connected to the common node and to effective signal ground, having a frequency-selective coupling to the effective signal ground, and configured to provide common mode negative feedback signals to the plurality of transistors for common mode signals in a first frequency range and to shunt common mode signals to the effective signal ground for common mode signals in a second frequency range.

The load impedance is either purely resistive, inductive, or provided by a combined resistor and inductor circuit network. The degeneration impedance may comprise a parallel resistor and capacitor network. In some embodiments, the degeneration impedance is frequency selective to provide increased amplifier gain for frequencies above a predetermined peaking frequency. The apparatus may comprise one or more signal comparators connected to outputs of the multi-input amplifier, where the wires of the multi-wire communication medium convey signals of a balanced vector signaling code to the inputs.

In a further embodiment, the apparatus may comprise a multi-wire communications medium comprising a plurality of wires; a multi-input amplifier having a plurality of amplifier branches, each amplifier branch of the plurality of amplifier branches connected a respective wire of the multi-wire communications medium; a frequency-selective common mode impedance electrically interconnecting the plurality of amplifier branches in a differential amplifier configuration for signals below a first cutoff frequency and electrically isolating the plurality of amplifier branches in a non-differential amplifier configuration for signals above a first cutoff frequency.

In an embodiment, the first cutoff frequency is configured to provide greater than 6 dB of attenuation of frequencies approximately equal to 1/(2Tskew), where Tskew is a maximum timing offset between signal pulses applied to respective transistor amplifiers. In a further embodiment, the plurality of source-connected degeneration impedances is frequency selective and provides reduced impedance magnitude at higher frequencies to provide high frequency signal peaking.

Figure 4:
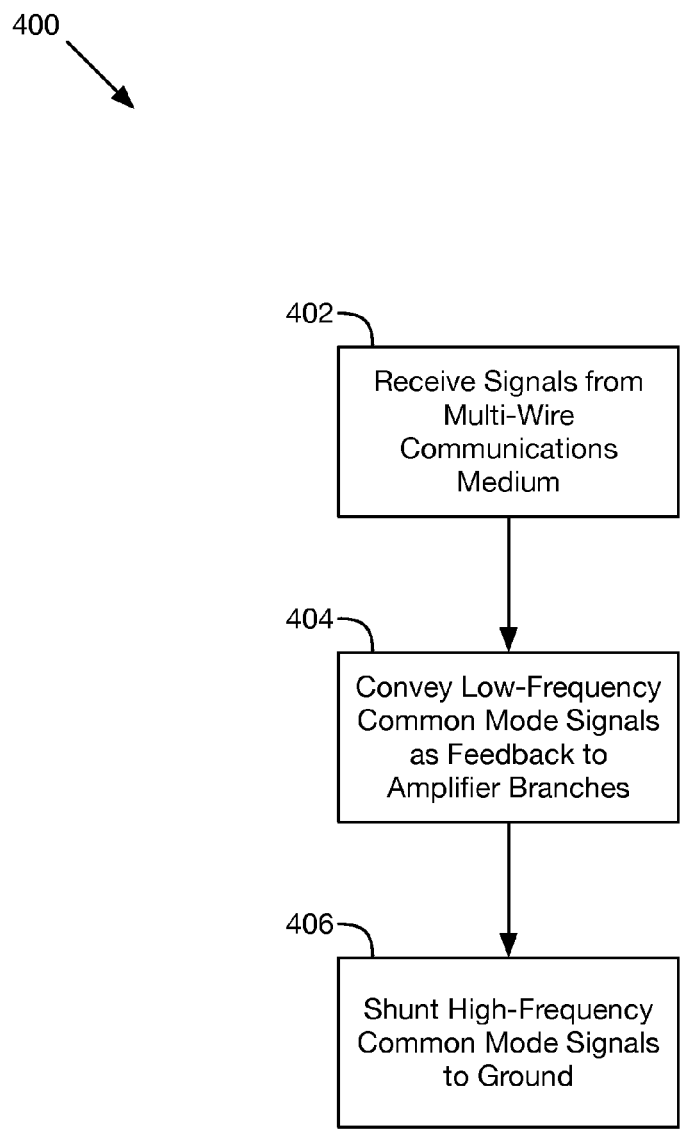
FIG. 4 is a flow diagram of an embodiment of a method of equalizing signals.

With respect to FIG. 4, a method 400 will be described. At block 402, signals are received from a plurality of wires of a multi-wire communications medium. The signals are received by the multi-input amplifier, where each input is associated with a branch of the amplifier. Using the frequency-selective common node impedance, the circuit conveys (402) low-frequency common mode signals as common mode negative feedback to the plurality of amplifier branches. The signals are conveyed due to the higher magnitude of the real part of the common node impedance, which provides signal isolation with respect to the effective signal ground node. Note that low-frequency common mode signals are those that are below the cutoff frequency. At 404, the circuit, via the frequency-selective common node impedance, shunts the common mode signals having a frequency above the cutoff frequency to effective signal ground. This causes the multi-input amplifier to behave as independent single ended amplifiers with respect to higher frequencies, rather than as a differential amplifier with common mode rejection.

The method 400 may further comprise increasing the amplifier gain of each amplifier branch as a function of frequency by decreasing a magnitude of a high-frequency impedance component of the degeneration impedances in the amplifier branches. The degeneration impedances include a capacitor in the degeneration impedance. In some embodiments, the degeneration impedance comprises a parallel resistor and capacitor network, such as one or more capacitors in parallel with one or mode resistors. In some embodiments, the capacitors and/or the resistor elements are switchable to provide a tunable impedance. In some embodiments, the circuit includes a training controller for iteratively adjusting the impedance values and determining a cutoff frequency that improve a performance metric. In one embodiment, a bit or frame error rate may be monitored as the training controller adjusts the impedance values of the common node impedance.

The method 400 may further comprise sampling output signals of the amplifier branches using time instants that offset differential input delays. In some embodiments, the circuit includes a training controller for iteratively adjusting the timing instants and determining timing instants that improve a performance metric. In one embodiment, a bit or frame error rate may be monitored as the training controller adjusts the timing of the sampling instants.

In further embodiments, the method 400 may further comprise applying outputs of the amplifier branches to a plurality of comparators.

Further Embodiments

It should be noted that placement of the current sink at each transistor's source, rather than at the shared node as is common practice, allows degeneration resistor Rd to remain outside of the DC current path. Thus, unlike in a conventional differential stage, the presence of Rd does not result in a loss of amplifier headroom.

In a practical embodiment, the multiple instances of FIG. 3's circuit element 300 may be physically distant in the integrated circuit design, requiring the common node signal line to span those elements. However, as the common node by design has a capacitance to ground, the resulting introduction of parasitic capacitance due to wire routing need not be an issue, as the parasitic capacitance may be factored into the overall Cc value.

Some embodiments of the circuit of FIG. 3 may allow one or more component to be adjustable or trimmable. As one example, Rd and/or Cd can be adjusted to set the position of the zero and pole, as in a classical differential analog equalizer. Switching parallel or serial R or C elements into and out of the circuit using pass transistors or CMOS analog switches may perform such adjustment, as one example.

The value of Cc is usually be set by design, by considering the lowest frequency components of the common-mode signal, which in turn depends on the amount of skew in the system. If Rd is being adjusted, it might be necessary to adjust Cc as well, if it is desired that the common-mode cutoff frequency remains the same.

One further embodiment eliminates the degeneration impedance $1/(2pi*Rd*Cd)$ from each transistor source (that is, connecting each source to the common node with Cc to ground) resulting in a circuit acting as a hybrid, transitioning from a generalized differential amplifier with N inputs to N single-ended common-source amplifiers at a transition frequency of approximately $gm//(2pi*Cc)$. A similar embodiment incorporates Rd and Cc without Cd. In such an embodiment, the low-frequency common mode rejection is provided, as well as the non-differential high frequency amplification, but the higher frequency signal peaking is not.

Another embodiment replaces load resistors RL with an inductor or inductor and resistor combination to provide additional frequency peaking, as is common practice. Another embodiment replaces or augments load resistors RL with a current mirror or other known active load structure, either as an explicit transistor loading element, or as part of the circuitry receiving an Output signal, thus effectively being in parallel with the described load RL.

At least one embodiment combines the described continuous time linear equalization with time-based skew compensation that adjusts the sampling time of each wire to compensate for differential signal arrival times.

Although illustrated as part of a system utilizing a balanced vector signaling code, the described embodiments may be used in any receiver application where the input signal or signals do not have an appreciable transmitted common mode component, one such example being a system using differential signaling.

The examples illustrate the use of vector signaling codes for point-to-point wire communications. However, this should not been seen in any way as limiting the scope of the described invention. The methods disclosed in this application are equally applicable to other encoding methods, and to communication media including optical and wireless communications. Thus, descriptive terms such as "voltage" or "signal level" should be considered to include both electrical equivalents such as "current", and also equivalents in other measurement systems, such as "optical intensity", "RF modulation", etc. Similarly, specific examples provided herein are for purposes of description, and do not imply a limitation.

As used herein, "physical signal" includes any suitable behavior and/or attribute of a physical phenomenon capable of conveying information. In accordance with at least one embodiment of the invention, physical signals may be tangible and non-transitory.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (herein "Cronie I");

U.S. Patent Publication No. 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (herein "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (herein "Cronie III");

U.S. Provisional Patent Application No. 61/753,870, filed Jan. 17, 2013, naming John Fox, Brian Holden, Peter Hunt, John D Keay, Amin Shokrollahi, Richard Simpson, Anant Singh, Andrew Kevin John Stewart, and Giuseppe Surace, entitled "Methods and Systems for Chip-to-chip Communication with Reduced Simultaneous Switching Noise" (herein called "Fox I");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (herein called "Fox II");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (herein called "Fox III");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (herein called "Fox IV");

U.S. patent application Ser. No. 13/842,740, filed Mar. 15, 2013, naming Brian Holden, Amin Shokrollahi, and Anant Singh, entitled "Methods and Systems for Skew Tolerance in and Advanced Detectors for Vector Signaling Codes for Chip-to-Chip Communication" (herein called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (herein called "Ulrich I").

I claim:

1. An apparatus comprising:
   a plurality of transistors, each transistor of the plurality of transistors having (i) an input node connected to a respective wire of a multi-wire communication medium, (ii) a drain-connected load impedance, (iii) a transistor drain signal output node, (iv) a transistor source node and (v) a source-connected current sink;
   a plurality of degeneration impedances, each separately connecting respective transistor sources to a common node; and,
   a common node capacitance connected to the common node and to effective signal ground, having a frequency-selective coupling to the effective signal ground, and configured to provide common mode negative feedback signals to the plurality of transistors for common mode signals in a first frequency range and to shunt common mode signals to the effective signal ground for common mode signals in a second frequency range.

2. The apparatus of claim 1, where the load impedance is selected from the group consisting of a resistor, an inductor, and a resistor-inductor network.

3. The apparatus of claim 1, where the degeneration impedance comprises a parallel resistor and capacitor network.

4. The apparatus of claim 3 wherein the degeneration impedance is frequency selective to provide increased amplifier gain for frequencies above a predetermined peaking frequency.

5. The apparatus of claim 1, where signals on the transistor drain signal output nodes are sampled a time instants to offset differential input delays.

6. The apparatus of claim 1, where the wires of the multi-wire communication medium convey signals of a balanced vector signaling code.

7. An apparatus comprising:
   a multi-wire communications medium comprising a plurality of wires;
   a multi-input amplifier having a plurality of amplifier branches, each amplifier branch of the plurality of amplifier branches connected a respective wire of the multi-wire communications medium;
   a frequency-selective common mode impedance electrically interconnecting the plurality of amplifier branches in a differential amplifier configuration for signals below a first cutoff frequency and electrically isolating the plurality of amplifier branches in a non-differential amplifier configuration for signals above a first cutoff frequency.

8. The apparatus of claim 7 wherein the first cutoff frequency is configured to provide greater than 6 dB of attenuation of frequencies approximately equal to $1/(2T_{skew})$, where $T_{skew}$ is a maximum timing offset between signal pulses applied to respective transistor amplifiers.

9. The apparatus of claim 7 wherein each of the plurality of source-connected degeneration impedances is frequency selective and provides reduced impedance magnitude at higher frequencies to provide high frequency signal peaking.

10. A method comprising:
    receiving signals from a plurality of wires of a multi-wire communications medium at a multi-input amplifier having a plurality of amplifier branches;
    conveying low-frequency common mode signals as common mode negative feedback to the plurality of amplifier branches via a frequency-selective common mode impedance; and,
    shunting common mode signals above the cutoff frequency to effective signal ground via the frequency-selective common mode impedance.

11. The method of claim 10 further comprising:
    increasing an amplifier gain of each amplifier branch as a function of frequency by decreasing a magnitude of a high-frequency component of amplifier branch degeneration impedances via a capacitor in the degeneration impedance.

12. The method of claim 11, where the degeneration impedance comprises a parallel resistor and capacitor network.

13. The method of claim 10 further comprising sampling output signals of the amplifier branches using time instants that offset differential input delays.

14. The method of claim 10 further comprising applying outputs of the amplifier branches to a plurality of comparators.

* * * * *